Dec. 7, 1971    T. F. URBANOSKY    3,625,063
PRESSURE RATIO TRANSDUCER
Filed March 6, 1970    2 Sheets-Sheet 2

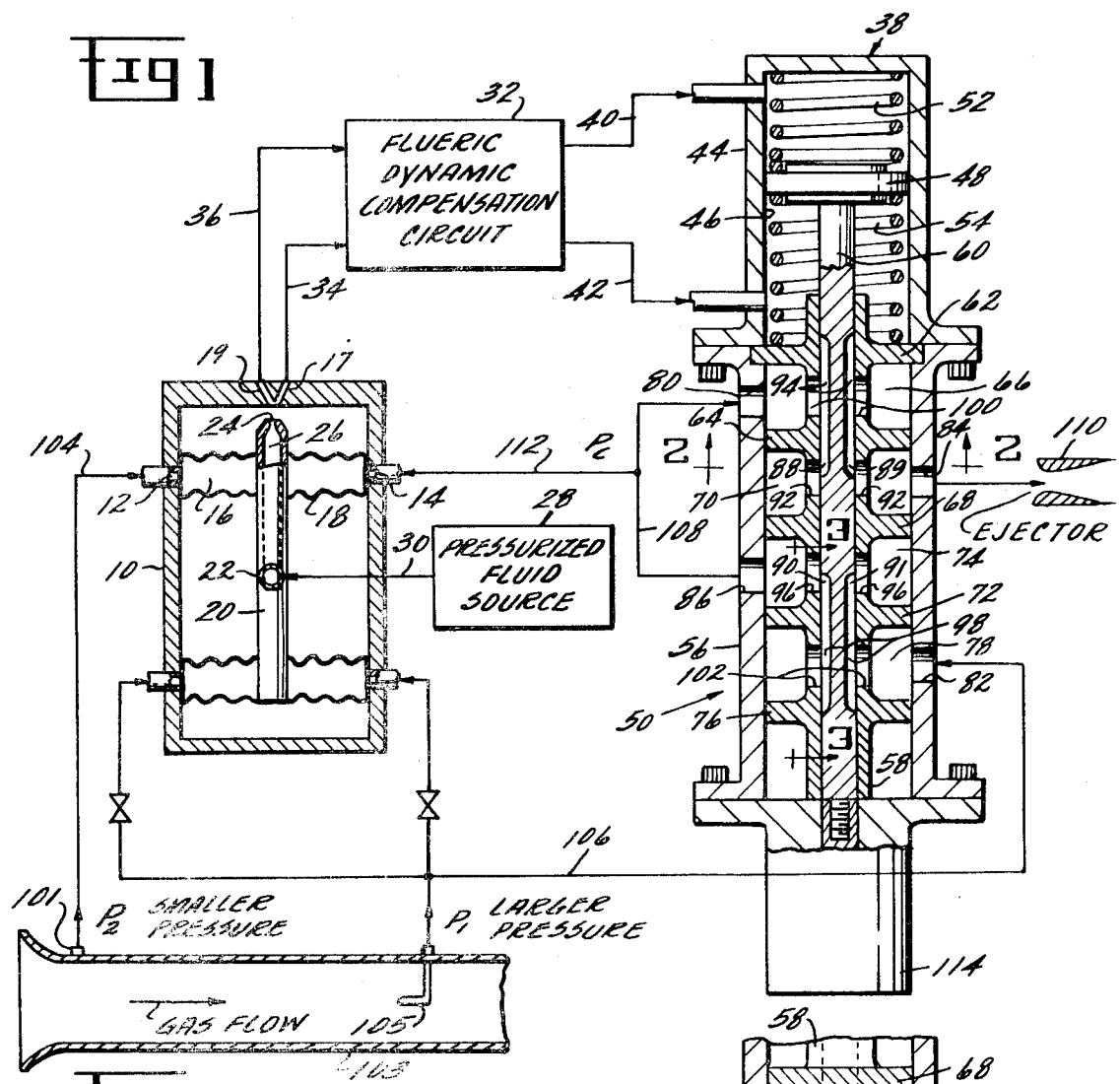

INVENTOR.
THOMAS F. URBANOSKY
BY
ATTORNEY-

United States Patent Office 3,625,063
Patented Dec. 7, 1971

3,625,063
PRESSURE RATIO TRANSDUCER
Thomas F. Urbanosky, Cincinnati, Ohio, assignor to
General Electric Company
Filed Mar. 6, 1970, Ser. No. 17,188
Int. Cl. G01l 13/02
U.S. Cl. 73—407 PR    7 Claims

ABSTRACT OF THE DISCLOSURE

A pressure ratio sensor or transducer for generating an output proportional to $P_2/P_1$ is disclosed which comprises a fluid signal summing device, a flueric dynamic compensation circuit, a mechanical valve, and a feedback loop. $P_2$ provides an input to the summing device, while $P_1$ provides an input to the mechanical valve. The mechanical valve is basically a spool valve with three lands and an integral piston of larger diameter. The output of the fluerics is a differential pressure which is applied across the piston area to drive the spool. As the spool moves, each of the three lands crosses over a shaped port varying the exposed area in some prescribed fashion. Two of these areas are used to form an area ratio which is a unique function of the pressure ratio of concern. The third generates an output signal which is a function of the shaft position, which, in turn, yields an output indicative of the sensed pressure ratio.

BACKGROUND OF THE INVENTION

This invention relates to fluid signal computing devices, and more particularly to a device for accepting two fluid pressure signals and generating a measurable physical output which is a function of the ratio between them.

The invention herein described was made in the course of or under a contract, or subcontract thereunder, with the U.S. Department of the Air Force.

The ratio between two pressure levels can be a useful control or indicating parameter in several applications, such as in the measurement of the Mach number of a flowing gas stream for the control of turbofan aircraft engines. Such an application requires a sensitive device because of the relatively small changes in total to static pressure differential for Mach number changes of interest. While the literature contains proposals for computing the ratio of two pressures, a device with better accuracy and sensitivity than that of those proposed is required. It is therefore the primary object of this invention to provide such a device.

BRIEF DESCRIPTION OF THE INVENTION

Briefly stated, the invention comprises a fluid signal summing device having the lower of the two pressures to be ratioed as one input and a signal derived by a fluidic network from the higher of the two pressures to be ratioed as a feedback input. The output of the summing device operates a valve which changes the area ratio between two orifices to generate the feedback input. The valve position is a function of the pressure ratio of interest.

DESCRIPTION OF THE DRAWINGS

While the invention is particularly pointed out and distinctly claimed in the claims appearing at the end of the specification, it is believed that it will be more clearly understandable from the description below and the accompanying drawings in which:

FIG. 1 is a partially schematic, partially section view of one embodiment of the invention;
FIG. 2 is a section view taken along line 2—2 of FIG. 1;
FIG. 3 is a section view taken along line 3—3 of FIG. 1.

DESCRIPTION OF THE PREFERRED EMBODIMENT

Figure 4:
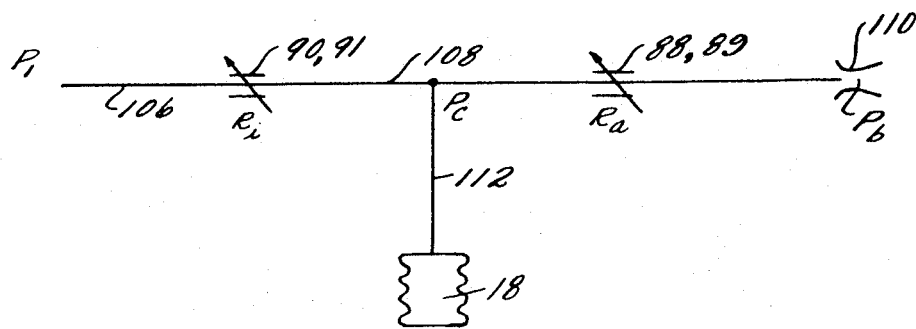
FIG. 4 is a schematic view of a fluidic circuit.

FIG. 1 illustrates the invention in a preferred form. A fluid signal summing device 10 includes signal input ports 12, 14 and a pair of closely spaced output ports 17, 19. Input ports 12, 14 are connected to the interior of bellows 16, 18 respectively, which are in turn mechanically connected with jet pipe 20. Jet pipe 20 is pivotally mounted at pivot 22 to move in response to extension or contraction of bellows 16, 18 caused by pressure differentials between inlet ports 12, 14. Jet pipe 20 includes a nozzle 24 and an internal passageway 26 connected to a source of pressurized fluid 28 via conduit 30. Nozzle 24 is aligned with the plane of output ports 17, 19 and directed at null to a point approximately midway between them.

When fluid source 28 supplies fluid to nozzle 24, a relatively high velocity fluid stream is directed to output ports or receivers 17, 19, captured by receivers 17, 19, and converted to static pressures proportional to the difference in signal pressures between input ports 12, 14. If the signal pressure at 12 exceeds that at 14, the output pressure at 17 will exceed that at 19, and vice versa. Thus, a device 10 is provided for providing a push-pull output signal (i.e. the pressure differential between ports 17 and 19) which is proportional to and algebraically of the same sign as the pressure differential between ports 12 and 14.

The output of ports 17, 19 is directed to a flueric dynamic compensation circuit 32 through conduits 34, 36 respectively. Circuit 32 includes proportional amplification of the output from device 10 and can additionally include dynamic compensation functions designed to tailor the response of the overall system of which the invention is a part.

The output of circuit 32 is transmitted to feedback device 38 by conduits 40, 42. Device 38 comprises a housing 44 which has a cylindrical bore 46 with a piston 48 slideably disposed therein, and a valve 50 operatively connected with piston 48. Piston 48 is suspended between two springs 52, 54 to render the output of the device 38 relatively insensitive to gravitational loading.

Valve 50 comprises a casing 56 secured to housing 44, a sleeve 58 secured in housing 56, and a spool 60 slideably engaged with sleeve 58 and connected to piston 48.

Sleeve 58 includes an inner land 62 which closes bore 46 and in cooperation with land 64 defines an inlet annulus 66. Another land 68 cooperates with land 64 to form an outlet annulus 70, a fourth land 72 in cooperation with land 68 defines a second outlet annulus 74, and a fifth land 76 in cooperation with land 72 defines a second inlet annulus 78. Inlet ports 80, 82 are defined in valve casing 56 and open into inlet annuli 66, 72 respectively. Similarly outlet ports 84, 86 are adapted for fluid discharge from outlet annuli 70, 74 respectively.

Variable area orifices 88, 89 and 90, 91 are respectively defined by the combination of ports 92 with slots 94 and ports 96 with slots 98, slots 94, 98 being formed in spool 60. Each of orifices 88–91 is adjacent one of the outlet annuli 70, 74. The ports 92, 96 and slots 94, 98 are located relative to each other so that upon motion of spool 60, orifices 88, 89 close while orifices 90, 91 open and vice versa. Thus, motion of piston 48 caused by the output from summing device 10 through circuit 32 varies the area ratio of orifices 88, 89 to orifices 90, 91.

FIGS. 2 and 3 illustrate the valve 50 porting in more details. Ports 92, 96 are rectangular in shape, although variations in the shape can be made, and slots 94, 98 are long narrow slots extending radially into spool 60. Slots 94, 98 (see FIG. 3) are long enough to completely overlap the corresponding ports 100, 102 which are in sleeve 58 at annuli 66, 78 respectively. This overlap is sufficient to insure that the only orifice area variation in each of the paths through the valve is at orifices 88-91. Diametrally opposite parallel flow paths through slots 94, 98 are provided to preclude side loading of spool 60, which could contribute to valve friction and reduce sensitivity of the pressure ratio sensor.

Signal input to the pressure ratio sensor is accomplished via conduit 104 and the resistance network which comprises conduit 106 and variable area orifices 88-91. When the pressure ratio sensor is used as a Mach number sensor, $P_2$, the smaller of the pressures to be ratioed, is transmitted from a static pressure tap 101 in duct 103 to input port 12 by conduit 104. Fluid flow resulting from the potential of the larger of the pressures to be ratioed, $P_1$, is transmitted from pitot tube 105 via conduit 106 through parallel variable area orifices 90, 91, then into conduit 108, and then to the throat of ejector 110 through parallel variable area orifices 88, 89. A signal conduit 112 is teed from conduit 108 to transmit the pressure (designated $P_c$) intermediate the two variable area orifice pairs 90, 91, and 88, 89 to signal input port 14. A schematic representation of the $P_1$ input circuit is shown in FIG. 4 wherein $R_1$ signifies input resistance and $R_a$ signifies venting resistance.

Figure 5:
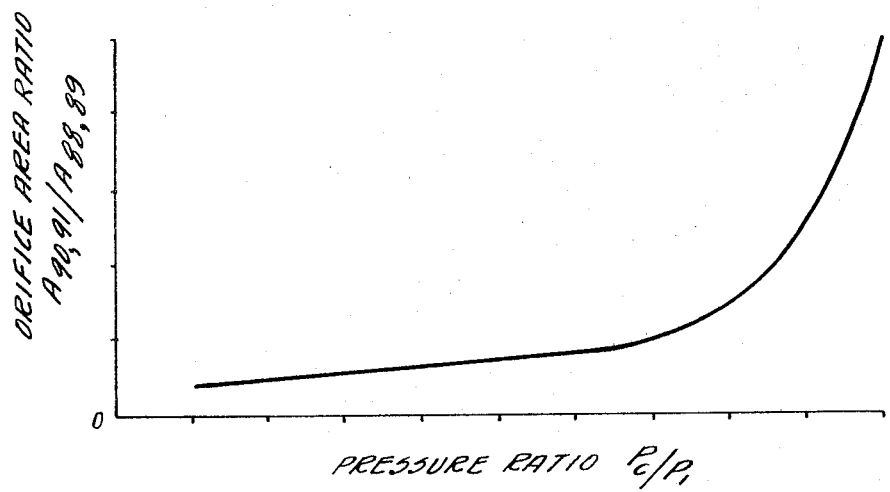
FIG. 5 is a diagram of the feedback characteristic of the invention.

If resistance $R_a$ shown in FIG. 4 (i.e. parallel orifices 88, 89) is made to flow choked and if the fluid flow in conduit 112 is very much less than that through parallel orifices 88, 89 (in the embodiment shown, the flow in conduit 112 is zero), the ratio $P_c/P_1$ is a unique function of the ratio of the effective area of variable area orifice pair 90, 91 to the effective area of variable area orifice pair 88, 89. This function is shown in FIG. 5.

The system shown in FIG. 1 is such that a pressure differential will exist between output ports 17 and 19 as long as $P_c$ and $P_2$ are unequal, which will in turn cause motion of piston 48 for $P_c$ unequal to $P_2$. This will adjust the area ratio of orifice pairs 88, 89 and 90, 91 until the feedback pressure $P_c$ is equal to $P_2$. Inasmuch as $P_c/P_1$ is a unique function of the said area ratio, and $P_c$ must equal $P_2$ at null, the ratio of $P_2$ to $P_1$ is also a unique function of the said area ratio. Further, the said orifice area ratio is a function of the axial position of spool 60. Thus spool 60 position is a physical measure of the ratio $P_2/P_1$. To the end of providing such a physical measure or indication of $P_2/P_1$, a position transducer 114 is attached to the end of valve 50. Transducer 114 can be a mechanical to electrical transducer or other device capable of converting mechanical position of spool 60 into a signal made useable in control circuitry or useable with visual indicating devices.

The feedback gain, i.e. ratio of the change in $P_c$ to a corresponding change in spool 60 position is a linearly increasing function of $P_1$. If the pressure ratio sensor is intended to operate over a small range of $P_1$, this presents no significant problem. If, however, the sensor must operate over a wide range of $P_1$, the gain change with $P_1$, must be compensated for to avoid dynamic instability while retaining acceptable response to pressure ratio changes. To this end, bellows 116, 118 are adapted to affect the force balance on jet pipe 20 and are supplied pressure at $P_1$ through tight restrictors 120, 122. The result is that the high frequency gain of device 10 varies approximately inversely with $P_1$. This compensates for the direct gain variation with $P_1$ of feedback device 38. A more complete discussion of the compensation function and a physical embodiment of a compensator-decoupler can be found in copending application Ser. No. 17,187, assignees docket number 13DV5251 in the name of H. B. Kast and B. S. Buckley, owned by the assignee of this application.

The invention described above is particularly useful for measuring the Mach number of a flowing air stream, as in the inlet to a gas turbine engine, by connecting conduit 104 to the static pressure tap in the air duct (i.e. $P_2=P_s$) and connecting conduit 106 to a total pressure tap in the air duct (i.e. $P_1=P_t$). At steady state, the output position of spool 60 is then representative of the ratio $P_s/P_t$, which is directly related to duct Mach number.

Having above described one embodiment of the invention, though not exhaustive of all possible equivalents, what is desired to be secured by Letters Patent is as described below.

What is claimed is:
1. A fluidic pressure ratio sensing system comprising:
a fluid signal summing means having a pair of signal input ports and a push-pull output means including a pair of output ports, said output means generating a pressure differential between said output ports proportional to the pressure differential between said input ports;
a fluidic network connected to a first of said signal input ports and adapted to a sense a pressure signal, said fluidic network comprising input conduit means which include an input resistor and a vending resistor, a signal conduit teed from said input conduit means at a point intermediate said input resistor and said venting resistor and connected to said first signal input port, said venting resistor having a resistance to fluid flow which is very much less than the resistance to fluid flow through said signal conduit;
venting resistor choking means associated with said input conduit means for causing said venting resistor to choke during operation of the said fluidic network in its normal operating range; and
feedback means for varying the flow area ratio between said input resistor and said venting resistor as a function of the output from said fluid signal summing means, said feedback means including means for providing an external indication of the said flow area ratio, which provides an output indicative of said sensed pressure ratio.

2. The pressure ratio system recited in claim 1 wherein said fluid signal summing means comprises a pivoted jet pipe connected to a source of pressurized fluid, receiver means closely disposed on opposite sides of the axis of said jet pipe for converting the velocity of the fluid issued from said jet pipe into pressure energy, and bellows means connected to said jet pipe to cause pivoting thereof in response to the difference between two opposed pressure signals, said bellows means being operatively connected to said signal input ports.

3. The pressure ratio sensor recited in claim 1 wherein said feedback means comprises a piston which is connected to be responsive to said push-pull output means and a valve connected to be responsive to motion of said piston, said valve including said input resistor and said venting resistor embodied in two different orifice means, at least one of said orifice means having an area which varies in response to motion of said piston.

4. The pressure ratio sensor recited in claim 3 wherein both said orifice means are variable in area and further wherein an increase in the area of one of said orifice means is accompanied by a decrease in the area of the other said orifice means.

5. The pressure ratio sensor recited in claim 4 wherein said valve includes a position transducer to measure the area ratio between said orifice means.

6. The pressure ratio sensor recited in claim 5 wherein said choking means comprises an ejector whose throat is connected to the discharge side of said venting resistor.

7. The pressure ratio sensor recited in claim 1, wherein said fluid signal summing means additionally includes a static pressure tap connected with a second of said signal input ports and a pitot tube connected with the said input conduit means of said fluidic network.

References Cited

Martiez, "Pressure Ratio Computer," Instruments and Control Systems, June 1969, vol. 42, pp. 85-89.

DONALD O. WOODIEL, Primary Examiner

U.S. Cl. X.R.

73—388